US006493485B1

(12) United States Patent
Korevaar

(10) Patent No.: US 6,493,485 B1
(45) Date of Patent: Dec. 10, 2002

(54) SYSTEMS AND METHODS FOR ALIGNING A LASER BEAM WITH AN OPTICAL FIBER

(75) Inventor: Eric Korevaar, San Diego, CA (US)

(73) Assignee: Astro Terra Corporation, San Diego, CA (US)

( * ) Notice: Subject to any disclaimer, the term of this patent is extended or adjusted under 35 U.S.C. 154(b) by 0 days.

(21) Appl. No.: 09/368,107

(22) Filed: Aug. 3, 1999

(51) Int. Cl.[7] .................................................. G02B 6/32
(52) U.S. Cl. ...................................................... 385/33
(58) Field of Search ............................ 385/31, 97, 89, 385/90, 33; 356/462–464, 334, 328, 141.63, 152, 121, 333; 359/159, 162, 191, 152, 462, 464, 287; 219/121.75

(56) References Cited

U.S. PATENT DOCUMENTS

| | | | |
|---|---|---|---|
| 3,742,947 A | | 7/1973 | Hashem |
| 4,452,506 A | * | 6/1984 | Reeve et al. |
| 4,474,423 A | * | 10/1984 | Bisbee et al. |
| 4,812,641 A | | 3/1989 | Ortiz, Jr. |
| 4,838,631 A | * | 6/1989 | Chande et al. ......... 219/121.75 |
| 4,870,952 A | | 10/1989 | Martinez |
| 4,878,045 A | | 10/1989 | Tanaka et al. |
| 5,229,593 A | | 7/1993 | Cato |
| 5,416,627 A | | 5/1995 | Wilmoth |
| 5,680,104 A | | 10/1997 | Slemon et al. |

OTHER PUBLICATIONS

E. Korevaar et al., *Status of SDIO/IS&T Lasercom Testbed Program*, pp. 116–127, SPIE vol. 1866, Jan. 1993.
E. Korevaar et al., *Status of BMDO/IST Lasercom Advanced Technology Demonstration*, pp. 96–107, SPIE vol. 2123, Jan. 1994.
E. Korevaar et al., *Design of Satellite Terminal for BMDO Lasercom Technology Demonstration*, pp. 60–71, SPIE vol. 2381, Feb., 1995.

J. Schuster et al., *Optomechanical Design of STRV–2 Lasercom Transceiver Using Novel Azimuth/Slant Gimbal*, pp. 227–239, SPIE vol. 2699, Jan. 1996.

K.E. Wilson et al., *Preliminary Results of the Ground/Orbiter Lasercomm Demonstration Experiment between Table Mountain and the ETS–VI Satellite*, pp. 121–132, SPIE vol. 2699, May 1996.

* cited by examiner

Primary Examiner—Frank G. Font
Assistant Examiner—Tu T Nguyen
(74) Attorney, Agent, or Firm—Nydegger & Associates

(57) ABSTRACT

A system for aligning a laser beam with the end of an optical fiber includes optics for focusing the laser beam toward the end of the optical fiber. A plurality of light receptors are positioned around the end of the optical fiber and, as intended for the present invention, each light receptor generates a light signal which is indicative of the light intensity from the laser beam that is incident on it. Connected with this plurality of light sensors is a comparator which creates an error signal that is proportional to a difference between selected light signals from the light receptors. The laser beam can then be moved relative to the end of the optical fiber in response to the error signal to align the laser beam with the end of the optical fiber. When alignment is achieved, the light signals will be substantially equal to each other and the error signal will be a null.

20 Claims, 2 Drawing Sheets

SYSTEMS AND METHODS FOR ALIGNING A LASER BEAM WITH AN OPTICAL FIBER

FIELD OF THE INVENTION

The present invention pertains generally to light beam alignment systems. More particularly, the present invention pertains to systems for focusing a laser beam to a predetermined specific point in space. The present invention is particularly, but not exclusively, useful for aligning the focal point of a laser beam with the end of an optical fiber.

BACKGROUND OF THE INVENTION

As is well known, an optical fiber is an elongated ultra-pure glass fiber that includes a central core and has an outer cladding which completely surrounds the core along the length of the fiber. Importantly, the central core has a higher refractive index than its outer cladding and the optical fiber is, therefore, capable of conducting modulated light signals from one end of the fiber to the other by total internal reflection.

Optical fibers can be generally categorized as either single mode or multimode fibers. More specifically, for single mode optical fibers, the diameter of the inner core is comparable with the wavelength of the light that is being propagated. Consequently, there is only one mode of light propagation through the fiber. Multimode fibers, on the other hand, have a core diameter sufficiently larger than the wavelength of light to allow propagation of light energy in a large number of different modes. Still, in order to avoid mode dispersion and the resultant distortion of signals, the core size of an optical fiber has dimensional limitations. The consequence of all this is that optical fibers, when used for communications purposes, will typically have relatively small diameters, e.g. approximately fifty microns (50 $\mu$m). While such small diameters may be advantageous for many applications, small diameters also raise issues about how best to direct light from a light source into the optical fiber for subsequent transmission through the fiber.

In order to effectively use optical fibers in communications systems it is essential there be some ability to optically interconnect the optical fiber with the light source. Heretofore, this has typically been accomplished by mechanical means. Specifically, by establishing a mechanical link between the light source and the optical fiber, it has been possible to be reasonably assured that light from the light source will enter the optical fiber. The situation changes, however, when it is necessary to establish an optical link between a light source and an optical fiber across free space. Further, the difficulty in establishing such a free space link is compounded as the distance between the light source and the optical fiber is increased. Nevertheless, there are applications wherein it may be desirable to establish a laser (light) communications link across a free space distance that may be as much as five hundred meters, or more.

In light of the above, it is an object of the present invention to provide a system for aligning a laser beam with the end of an optical fiber which is capable of directing a focused laser beam onto the inner core of an optical fiber. Another object of the present invention is to provide a system for aligning a laser beam with the end of an optical fiber which will effectively establish a laser communications link across free space through a distance in excess of several hundred meters. Yet another object of the present invention is to provide a system for aligning a laser beam with the end of an optical fiber that is simple to use, relatively easy to implement, and comparatively cost effective.

SUMMARY OF THE PREFERRED EMBODIMENTS

A system for aligning a laser beam with the target end of an optical fiber includes optics which will focus or direct the laser beam toward the fiber's target end. A plurality of three or more light receptors are positioned to surround the end of the optical fiber and they are, preferably, coplanar with the end of the optical fiber. Importantly, each of the light receptors is capable of generating a light signal that is indicative of the intensity of the portion of the laser beam that is incident on the particular light receptor. For the purposes of the present invention, the light receptors can be tracking optical fibers which are juxtaposed with the target optical fiber.

For the system of the present invention, a comparator is electronically connected with each of the light sensors and is used for creating an error signal. Specifically, the error signal that is generated by the comparator is proportional to a difference between selected light signals as they are generated by the light receptors. Using standard feedback control techniques, this error signal can then be used for moving the laser beam relative to the end of the optical fiber in response to the error signal. With this controlled movement, the system is able to align the laser beam with the end of the optical fiber.

By way of example, consider a system using four light receptors which are arranged around the target end of the optical fiber in diametrically opposed pairs. Within this arrangement, all four of the light receptors and the end of the optical fiber will be located in an x-y plane. Specifically, one pair of receptors will be aligned along an x-axis, while the other pair is aligned along a y-axis. The optics of the system can then be used to locate the focal point of the laser beam in this x-y plane (i.e. the laser beam is focused onto the x-y plane in three dimensional space so that z=0). With the laser beam focal point in the x-y plane, one pair of light receptors can then be used by the comparator to position the end of the optical fiber relative to the laser beam in the x direction (i.e. x=0), while the other pair of light receptors can be used to position the end of the optical fiber relative to the laser beam in the y direction (i.e. y=0). As indicated above, this is accomplished using the error signal. More specifically, when the light signals from the pair of light receptors on the x-axis are equal, the laser beam will be centered in the x direction. Likewise, when the light signals from the pair of light receptors on the y-axis are equal, the laser beam will be centered in the y direction. Stated differently, the error signal will be a null when all of the light signals from the respective light receptors are substantially equal to each other.

Movement of the target end of the optical fiber relative to the laser beam, in order to obtain a null error signal, can be accomplished in any of several ways. First, the optical fiber itself can be moved relative to the optical system focusing the laser beam. Second, the optical fiber and the focusing optics can be mounted on a base, and the base can be moved. Third, the system's focusing optics can be mounted on the base along with the optical fiber and the optics can include a plurality of mirrors, of which one is a secondary mirror. For this configuration the secondary mirror can be moved until the error signal is null.

In a refinement for the system of the present invention, the optics used for directing the laser beam toward the end of the target optical fiber can be configured to profile the laser beam. For the purposes of the present invention, the laser beam needs to be profiled with a high-intensity region and a low-intensity region. Specifically, the high-intensity region will be centrally located in the laser beam and the low-intensity region will be peripherally located in the laser beam to surround the high-intensity region. Importantly, the low-intensity region of the profiled laser beam must have sufficient intensity to generate the light signals that are required from the light receptors for generating the error signal.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
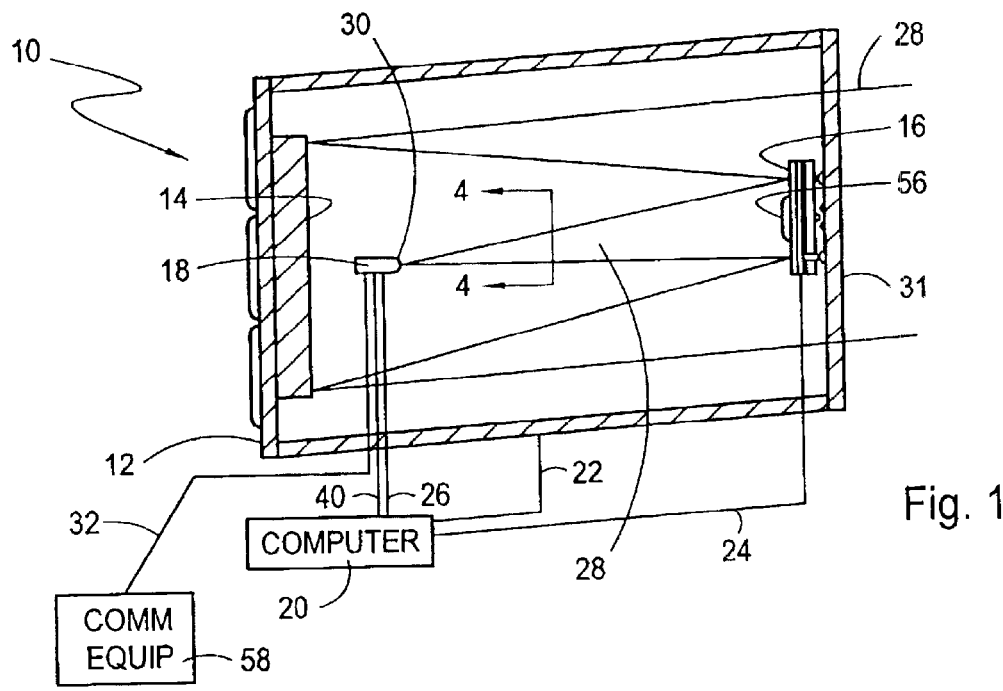
FIG. 1 is an elevational cross section view of a system in accordance with the present invention.

Referring initially to FIG. 1, a system in accordance with the present invention is shown and is generally designated 10. As shown, the system 10 includes a base 12, and a reflector 14 which is mounted on the base 12. Also, a secondary mirror 16 and a receiver 18 are mounted on the base 12. Further, a comparator/computer 20 is provided for the system 10.

As intended for the system 10, the comparator/computer 20 can be any type device or electronic circuit which is capable of differentiating between light intensity signals and, in turn, generating a signal that is proportional to such differences. In accordance with subsequent disclosure, a purpose of the present invention is to correctly position components of system 10. For this purpose, the comparator/computer 20 can be alternatively connected with the base 12 via a control line 22, or with the secondary mirror 16 via a control line 24, or with the receiver 18 via a control line 26. If desired, however, all three of these connections can be implemented simultaneously. In any case, it is intended for the comparator/computer 20 to provide positional control over the base 12, the secondary mirror 16, or the receiver 18 via respective control lines 22, 24 or 26 for purposes of aligning the receiver 18 with an incoming laser beam 28. As will be appreciated by the skilled artisan, the actual movement of the base 12, the secondary mirror 16 or the receiver 18 in response to signals from the comparator/computer 20 can be accomplished by mechanisms (not shown) which are well known in the pertinent art.

FIG. 1 shows that the system 10 is intended to receive the incoming laser beam 28 and to then focus the laser beam 28 onto an end 30 of the receiver 18, by using various optical elements. More specifically, the optics for the particular embodiment of the system 10 shown in FIG. 1 allow the laser beam 28 to enter the housing of the base 12 through an aperture 31 and be incident on the reflector 14. The laser beam 28 is then focused by the reflector 14 onto the secondary mirror 16 which, in turn, focuses the laser beam 28 onto the end 30 of the receiver 18. For the purposes of the present invention, the aperture 31 can be covered with glass, or with some other light transparent material, and the secondary mirror 16 and receiver 18 can be moveably or fixedly mounted on the base 12 in any manner well known in the pertinent art. The particular configuration for the system 10 shown in FIG. 1, (i.e. one which includes the reflector 14, secondary mirror 16 and receiver 18) is only exemplary. In fact, as contemplated for the present invention, components corresponding to the base 12, reflector 14 and secondary mirror 16 are optional. In sum, it is only necessary that the laser beam 28 somehow be focused by optics onto the end 30 of receiver 18.

Figure 2:
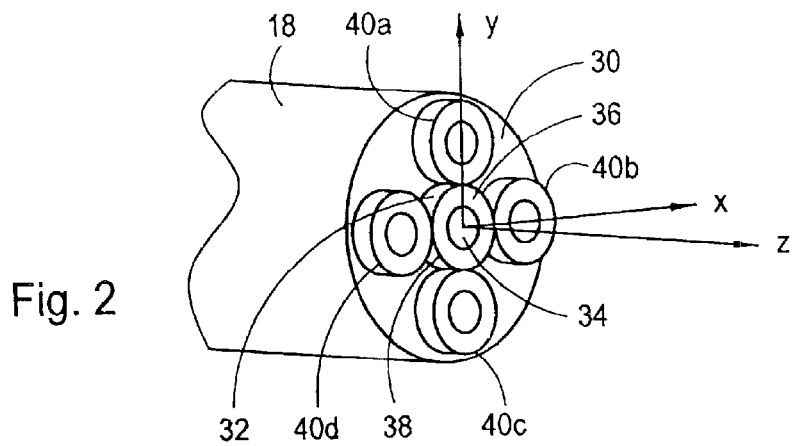
FIG. 2 is a perspective view of a target optical fiber juxtaposed in an arrangement with tracking optical fibers (light receptors) for receiving an incoming laser beam.

As shown in FIG. 2, the end 30 of receiver 18 exposes a target optical fiber 32 which includes a core 34 and a cladding 36. For purposes of orientation and subsequent discussion, the end 38 of optical fiber 32 is shown located in the x-y plane of an x-y-z Cartesian coordinate system. Thus, within this orientation, the laser beam 28 will be directed toward the end 38 of the target optical fiber 32 along the z-axis. As also shown in FIG. 2, a plurality of light receptors 40 (of which the light receptors 40a, 40b, 40c and 40d are exemplary) are arranged around the target optical fiber 32. For the present invention, these light receptors 40 can be tracking optical fibers with respectively associated detectors, and can be of the same type optical fiber as is used for the target optical fiber 32. For the purposes of the present invention the detectors can be of any type well known in the pertinent art and, preferably, are included as components of the comparator/computer 20. Further, although four light receptors 40 are shown for the preferred embodiment of the receiver 18 in FIG. 2, it will be appreciated by the skilled artisan that, in line with subsequent disclosure, and because any three points can define an x-y plane, as few as three tracking optical fibers (light receptors 40) will suffice for the purposes of the system 10. Nevertheless, for the preferred embodiment of the system 10, four light sensors 40 are to be used and arranged as diametrically opposed pairs substantially as shown in FIG. 2. More specifically, the light sensors 40a and 40c are aligned on the y-axis and respectively positioned on either side of the target optical fiber 32, while the light sensors 40b and 40d are similarly aligned on the x-axis.

Figure 3:
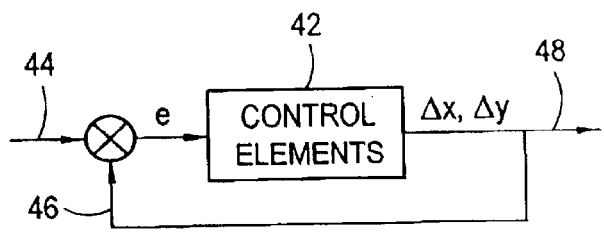
FIG. 3 is a diagram of a closed loop feedback control system that is indicative of the control system which is used for the present invention.

FIG. 3 shows a generalized diagram for the closed loop feedback control that is used by the system 10 to position the end 38 of the target optical fiber 32 relative to the incoming laser beam 28. To do this, the control elements 42 of the system 10 react to an error signal, e, that is generated by the difference between a reference input 44 (the desired position of end 38) and a feedback signal 46 (the actual position of end 38). The resultant error signal, e, is then used to obtain a desired output 48 (i.e. movement of the end 38 from its actual position to its desired position). For the system 10, the control elements 42 will include components of the system 10 that position and move either the base 12, the secondary mirror 16, or the receiver 18. These movements then constitute the desired output 48, and this output 48 continues to be generated until the receiver 18 is properly positioned relative to the laser beam 28. More specifically, an output 48 is generated until the laser beam 28 is effectively directed to enter the core 34 of target optical fiber 32 for further transmission through the fiber 32.

Figure 4:
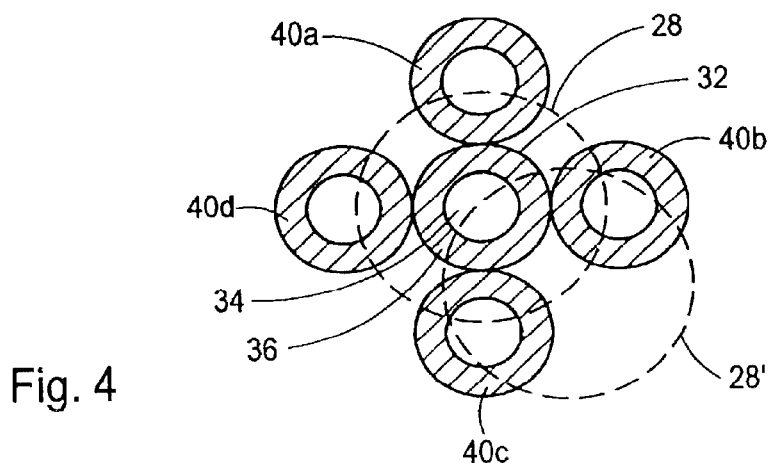
FIG. 4 is a front elevational view of the arrangement of the target optical fiber and tracking optical fibers as seen from the line 4—4 in FIG. 1.
Figure 5:
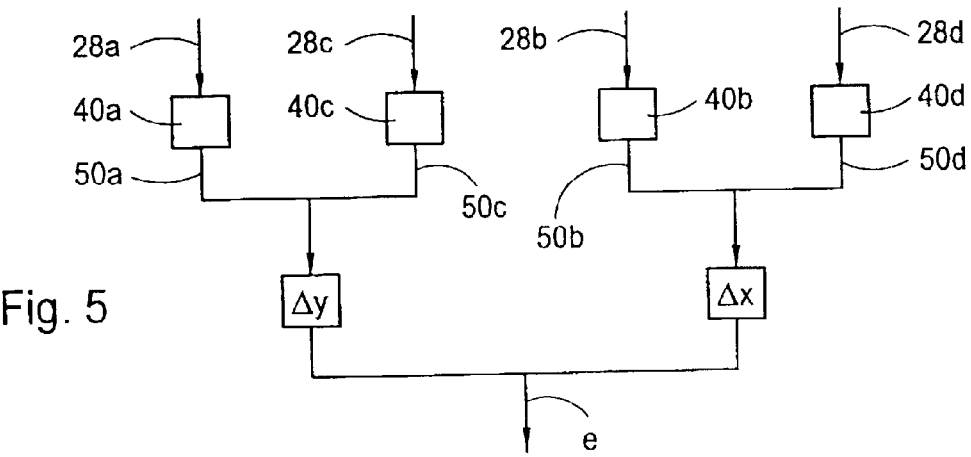
FIG. 5 is a schematic diagram showing the generation of an error signal for the arrangement shown in FIG. 4.

An error signal, e, which can be used by the system 10 to move the optical fiber 32 into alignment with the laser beam 28, will be best appreciated by reference to both FIG. 4 and FIG. 5. First, it is to be understood that the laser beam 28 can be focused by the optics of system 10 such that the focal point of the beam 28 will lie in the x-y plane. Once the focal point of beam 28 is in the x-y plane, however, there is still the problem of moving the focal point of the beam 28 in the x-y plane onto the optical fiber 32 so that as much light as possible from the laser beam 28 is able to enter the optical fiber 32. With this in mind, consider the situation indicated in FIG. 4 wherein the laser beam 28' is not focused directly onto the optical fiber 32 but, instead, is slightly off center.

For the condition shown in FIG. 4, the laser beam 28' is actually incident on only a portion of the optical fiber 32. Thus, an optimal use of the laser beam 28' is not possible. To obtain this optimal use the laser beam 28' needs to somehow be steered to the position of laser beam 28 as shown in FIG. 4. Thus, note that portions of the laser beam 28' are incident on the light sensors 40b and 40c, but that no portion of the laser beam 28' (or at least a relatively small portion of the laser beam 28') is incident on either of the light sensors 40a or 40d. Thus, because no portion (or a very small portion) of light beam 28' is incident on the light sensor 40a, the light signal 50a from light sensor 40a will have substantially a zero value (see FIG. 5). On the other hand, because a portion of the light beam 28' is incident on the light sensor 40c, the light sensor 40c will generate a light signal 50c that has some absolute value. The difference between these light signals 50a and 50c will then cause an error signal, e, to be generated which will indicate that the laser beam 28 needs to move relative to the optical fiber 32 through a distance, Δy. The important point here is that there is a difference in value between the light signals 50a and 50c. Further, depending on the relative magnitudes of the light signals 50a and 50c, the error signal, e, will also indicate whether Δy is positive (light signal 50a<light signal 50c) or negative (light signal 50a<light signal 50c). Similarly, because laser beam 28' is incident on light sensor 40b (i.e. light signal 50b has value), but it is not on light sensor 40d (i.e. light signal 50d at least has a different value than light signal 50b), there is a difference between the light signals 50b and 50d. Thus, the error signal, e, will indicate the need to move the optical fiber 32 relative to the laser beam 28 through a distance, Δx. Again, a positive or negative direction for the distance Δx will be determined by the relative magnitudes of the light signals 50b and 50d.

As long as there is a difference between light signal 50a and 50c, the error signal, e, will indicate a need to move some distance Δy. Also, as long as there is a difference between light signal 50b and 50d, the error signal, e, will indicated a need to move some distance Δx. Using conventional feedback control techniques, this will continue as long as there is an error signal, e. When the error signal, e, is a null, however, the laser beam 28 will be centered on the target optical fiber 32 as desired (see FIG. 4).

Figure 6:
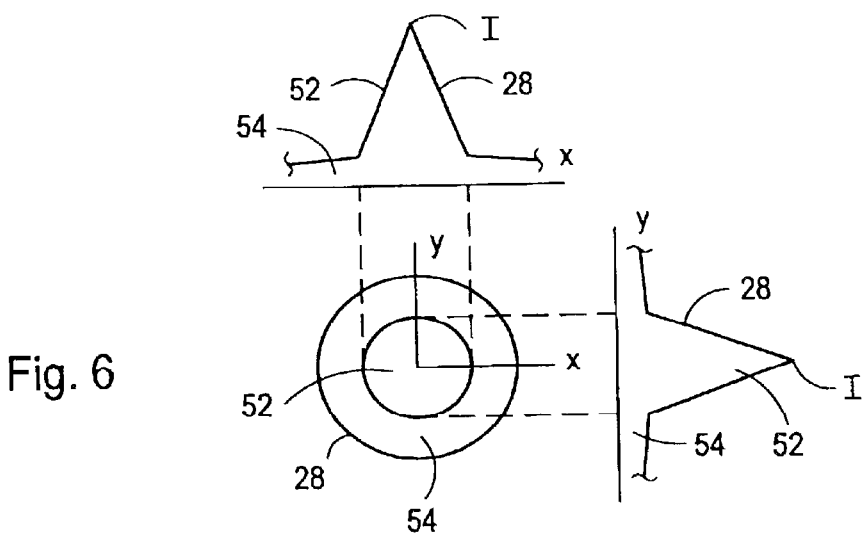
FIG. 6 is a schematic diagram of a light intensity profile for a laser beam useful for the purposes of the present invention as would be seen in both the x and y directions of a plane transverse to the laser beam path as identified by the line 4—4 in FIG. 1.

The operation of system 10 may be enhanced to some extent by profiling the laser beam 28. Specifically, as shown in FIG. 6, a profiled laser beam 28 will include a high-intensity region 52, which is located in the central portion of the laser beam 28. The profiled laser beam 28 will also include a low-intensity region 54 which is located peripherally in the laser beam 28 and which substantially surrounds the high-intensity region 52. As shown in FIG. 6 for a laser beam 28 having an intensity, I, a profiled beam 28 can be configured such that most of the light in the beam 28 is in the high-intensity region 52. It is important, however, that the intensity of light in the low-intensity region 54 of the laser beam 28 be sufficient for generating appropriate light signals 50.

The actual profiling of the laser beam 28 can be accomplished in any of several ways known in the pertinent art, such as by using compound refractive surfaces. For example, the refractive surface 56 shown on secondary mirror 16 in FIG. 1 can be specifically contoured to generate the high-intensity region 52, while the remainder of the secondary mirror 16 is left to generate the low-intensity region 54. Alternately, a diffractive element can be placed in the beam to create the appropriate contours.

In summary, during the operation of the system 10, the light receptors 40a–d (tracking optical fibers) will be used as described above to generate an error signal, e. The comparator/computer 20 then, in response to the error signal, causes positional adjustments to be made by either the base 12 (via line 22), the secondary mirror 16 (via line 24), or the receiver 18 (via line 26). With these adjustments, the laser beam 28 is caused to be focused onto the target optical fiber 32. As shown in FIG. 1, the optical fiber 32 is connected with communications equipment 58. Thus, upon proper alignment of the system 10, any communication signals that are carried on the laser beam 28 will be transmitted to the communications equipment 58 for subsequent use.

While the particular Systems and Methods for Aligning a Laser Beam With an Optical Fiber as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for aligning a laser beam in free space to a predetermined point which comprises:

optics for directing said laser beam in free space toward said point;

an optical fiber, said optical fiber having an end, with said end of said optical fiber positioned at said point for receiving said laser beam;

a plurality of light receptors surrounding said end of said optical fiber, with each said light receptor generating a light signal indicative of light intensity from said laser beam incident on said light receptor directly from free space;

a comparator electronically connected with said plurality of light receptors for creating an error signal, said error signal being proportional to a difference between selected said light signals; and means for moving said laser beam relative to said end of said optical fiber in response to said error signal to align said laser beam with said end of said optical fiber.

2. A system as recited in claim 1 wherein each said light receptor includes a tracking optical fiber having a first end and a second end, and wherein said first ends of said tracking optical fibers are juxtaposed with said end of said optical fiber and said second ends are respectively connected with a detector for generating said error signal.

3. A system as recited in claim 1 comprising four of said light receptors, said light receptors being arranged around said end of said optical fiber as diametrically opposed pairs of said receptors.

4. A system as recited in claim 1 wherein said means for moving is attached to said optical fiber.

5. A system as recited in claim 1 wherein said system further comprises:
   a base; and
   a mirror mounted on said base for directing said laser beam in free space toward said optical fiber.

6. A system as recited in claim 5 wherein said mirror is a spherical mirror and said means for moving is attached to said base.

7. A system as recited in claim 1 wherein said optics includes a spherical mirror and a secondary mirror and wherein said means for moving is attached to said secondary mirror.

8. A system as recited in claim 1 further comprising means for profiling said laser beam with a high-intensity region and a low-intensity region, wherein said high-intensity region is centrally located in said laser beam and said low-intensity region is peripherally located in said laser beam to surround said high-intensity region, said low-intensity region having sufficient intensity to generate said light signal.

9. A system as recited in claim 1 wherein said error signal is a null when all said light signals are substantially equal to each other.

10. A system for aligning a laser beam in free space with an end of an optical fiber which comprises:
    optics for directing said laser beam in free space toward said end of said optical fiber;
    at least three coplanar light receptors for generating respective light signals indicative of light intensity from said laser beam incident on said respective light receptor directly from free space;
    means for fixedly positioning said end of said optical fiber substantially in said plane of said light receptors with said end of said optical fiber substantially equidistant from each said light receptor; and
    means for moving said end of said optical fiber relative to said laser beam until said light signal from one said receptor is substantially equal to said light signals from all other said light receptors.

11. A system as recited in claim 10 wherein each said light receptor includes a tracking optical fiber having a first end and a second end, and wherein said first ends of said tracking optical fibers are juxtaposed with said end of said optical fiber and said second ends are respectively connected with a detector for generating said error signal.

12. A system as recited in claim 10 wherein said means for moving is attached to said optical fiber.

13. A system as recited in claim 10 wherein said system further comprises:
    a base; and
    a spherical mirror mounted on said base for directing said laser beam in free space toward said optical fiber, and wherein said means for moving is attached to said base.

14. A system as recited in claim 10 wherein said optics includes a spherical mirror and a secondary mirror and wherein said means for moving is attached to said secondary mirror.

15. A system as recited in claim 10 further comprising means for profiling said laser beam with a high-intensity region and a low-intensity region, wherein said high-intensity region is centrally located in said laser beam and said low-intensity region is peripherally located in said laser beam to surround said high-intensity region, said low-intensity region having sufficient intensity to generate said light signal.

16. A method for aligning a laser beam in free space with an end of an optical fiber which comprises the steps of:
    directing said laser beam in free space toward said end of said optical fiber;
    surrounding said end of said optical fiber with a plurality of light receptors, with each said light receptor generating a light signal indicative of light intensity from said laser beam incident on said light receptor directly from free space;
    creating an error signal, said error signal being proportional to a difference between selected said light signals; and
    moving said laser beam relative to said end of said optical fiber in response to said error signal to align said laser beam with said end of said optical fiber.

17. A method as recited in claim 16 wherein said moving step is accomplished by moving said optical fiber.

18. A method as recited in claim 16 wherein said optical fiber is mounted on a base, and a mirror is mounted on said base for directing said laser beam in free space toward said optical fiber, and wherein said moving step is accomplished by moving said base.

19. A method as recited in claim 16 wherein optics includes a spherical mirror and a secondary mirror and said moving step is accomplished by moving said secondary mirror.

20. A method as recited in claim 16 further comprising the step of profiling said laser beam with a high-intensity region and a low-intensity region, wherein said high-intensity region is centrally located in said laser beam and said low-intensity region is peripherally located in said laser beam to surround said high-intensity region, said low-intensity region having sufficient intensity to generate said light signal.

* * * * *

UNITED STATES PATENT AND TRADEMARK OFFICE
CERTIFICATE OF CORRECTION

PATENT NO. : 6,493,485 B1
DATED : December 10, 2002
INVENTOR(S) : Eric Korevaar

It is certified that error appears in the above-identified patent and that said Letters Patent is hereby corrected as shown below:

Column 5,
Line 39, delete "$50a$<light" insert -- $50a$ > light --

Signed and Sealed this

Twenty-ninth Day of April, 2003

JAMES E. ROGAN
*Director of the United States Patent and Trademark Office*